(12) United States Patent
Farrell et al.

(10) Patent No.: US 10,643,135 B2
(45) Date of Patent: May 5, 2020

(54) LINKAGE PREDICTION THROUGH SIMILARITY ANALYSIS

(71) Applicant: International Business Machines Corporation, Armonk, NY (US)

(72) Inventors: Robert G. Farrell, Cornwall, NY (US); Achille Fokoue-Nkoutche, White Plains, NY (US); Oktie Hassanzadeh, Port Chester, NY (US); Mohammad Sadoghi Hamedani, Chappaqua, NY (US); Meinolf Sellmann, Cortlandt Manor, NY (US); Ping Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 15/242,821

(22) Filed: Aug. 22, 2016

(65) Prior Publication Data
US 2018/0053096 A1 Feb. 22, 2018

(51) Int. Cl.
*G06N 5/02* (2006.01)
*G06F 16/901* (2019.01)

(52) U.S. Cl.
CPC ......... *G06N 5/022* (2013.01); *G06F 16/9024* (2019.01)

(58) Field of Classification Search
CPC ..... G06N 5/022; G06N 20/00; G06F 16/9024
See application file for complete search history.

(56) References Cited

U.S. PATENT DOCUMENTS

| 7,797,188 | B2 | 9/2010 | Srivastava |
| 8,725,666 | B2 | 5/2014 | Lemmond et al. |
| 8,924,319 | B1 | 12/2014 | Bearman |
| 9,195,941 | B2 | 11/2015 | Mojsilovic et al. |
| 2012/0246175 | A1 | 9/2012 | Duan et al. |
| 2015/0019588 | A1* | 1/2015 | Yang ................ G06Q 30/0201 707/776 |
| 2015/0095316 | A1 | 4/2015 | Nie et al. |
| 2015/0120623 | A1 | 4/2015 | Morara et al. |

(Continued)

OTHER PUBLICATIONS

Hasan M.A., Zaki M.J, "A Survey of Link Prediction in Social Networks", In: Aggarwal C. (eds) Social Network Data Analytics. Springer, Boston, MA, 2011, pp. 243-275. (Year: 2011).*

(Continued)

*Primary Examiner* — Vincent Gonzales
(74) *Attorney, Agent, or Firm* — Ryan, Mason & Lewis, LLP

(57) ABSTRACT

Methods, systems, and computer program products for linkage prediction through similarity analysis are provided herein. A computer-implemented method includes extracting multiple features from (i) one or more attributes of a set of source nodes within a knowledge graph and (ii) one or more attributes of a set of target nodes within the knowledge graph, wherein at least one extracted feature satisfies a designated complexity level; performing a similarity analysis across the at least one extracted feature by applying one or more similarity measures to the at least one extracted feature; predicting one or more sets of links between the source nodes and the target nodes based on the similarity analysis, wherein one or more sets of predicted links satisfy a pre-determined accuracy threshold; and outputting the one or more sets of predicted links to a user.

19 Claims, 5 Drawing Sheets

(56) References Cited

U.S. PATENT DOCUMENTS

| | | | |
|---|---|---|---|
| 2016/0098645 A1 | 4/2016 | Sharma et al. | |
| 2016/0155063 A1* | 6/2016 | Rich | G06F 16/9535 706/12 |
| 2016/0239746 A1* | 8/2016 | Yu | G06K 9/00 |

OTHER PUBLICATIONS

Li, Zhepeng, X. Fang, and O. Sheng, "A Survey of Link Recommendation for Social Networks: Methods, Theoretical Foundations, and Future Research Directions", Theoretical Foundations, and Future Research Directions, Oct. 28, 2015, pp. 1-34. (Year: 2015).*

Meij et al., Method and System for Automatically Explaining Entity Relationships in a Knowledge Graph, IPCOM000242025D, Jun. 15, 2015.

T. Mitchell et al., "Never-Ending Learning," Proceedings of the 29th Conference on Artificial Intelligence (AAAI), 2015, pp. 2302-2310, vol. 3.

A. Carlson et al., "Toward an Architecture for Never-Ending Language Learning," Proceedings of the 24th Conference on Artificial Intelligence (AAAI), Jul. 2010, pp. 1306-1313, vol. 5, No. 3.

J.M. Kanter et al., "Deep Feature Synthesis: Towards Automating Data Science Endeavors," IEEE International Conference on Data Science and Advanced Analytics (DSAA), Oct. 2015, pp. 1-10.

A. Neelakantan et al., "Compositional Vector Space Models for Knowledge Base Completion," Proceedings of the 53rd Annual Meeting of the Association for Computational Linguistics and the 7th International Joint Conference on Natural Language Processing, Jul. 2015, pp. 156-166.

T. Franz et al., "TripleRank: Ranking Semantic Web Data by Tensor Decomposition," Proceedings of the 8th International Semantic Web Conference (ISWC), Oct. 2009, pp. 213-228.

M. Nickel et al., "Holographic Embeddings of Knowledge Graphs," 30th Conference on Artificial Intelligence (AAAI), Dec. 2015, 7 pages.

M. Nickel et al., "Tensor Factorization for Multi-Relational Learning," Proceedings of the European Conference on Machine Learning and Principles and Practice of Knowledge Discovery in Databases (ECML PKDD), Part III, Sep. 2013, pp. 617-621.

B. Roth et al., "Minimally Supervised Event Argument Extraction Using Universal Schema," Neural Information Processing Systems (NIPS) Workshop on Automatic Knowledge Base Construction (AKBC), Dec. 2014, 5 pages.

M. Sadoghi et al., "Self-Curating Databases," Proceedings of the 19th International Conference on Extending Database Technology (EDBT), Mar. 2016, pp. 467-472.

B. Taskar et al., "Link Prediction in Relational Data," Advances in Neural Information Processing Systems (NIPS), Dec. 2003, 8 pages.

D. Liben-Nowell et al., "The Link Prediction Problem for Social Networks," Proceedings of the 12th International Conference on Information and Knowledge Management (CIKM), Nov. 2003, pp. 556-559.

L. Getoor et al., "Link Mining: A Survey," ACM SIGKDD Explorations Newsletter, Dec. 2005, pp. 3-12, vol. 7, No. 2.

W. Cukierski et al., "Graph-Based Features for Supervised Link Prediction," Proceedings of International Joint Conference on Neural Networks (IJCMM), Jul.-Aug. 2011, pp. 1237-1244.

A. Fokoue et al., "Predicting Drug-Drug Interactions Through Similarity-Based Link Prediction Over Web Data," Proceedings of the 25th International Conference Companion on World Wide Web (WWW), Apr. 2016, pp. 175-178.

A. Rawashdeh et al., "Similarity Measure for Social Networks—A Brief Survey," Proceedings of the 26th Modern AI and Cognitive Science Conference, 2015, 7 pages.

Parikshit Sondhi, "Feature Construction Methods: A Survey," sifaka.cs.uiuc.edu, 2009, 8 pages.

Peter Mell, et al. The NIST Definition of Cloud Computing, NIST Special Publication 800-145, Sep. 2011, pp. 1-7.

* cited by examiner

LINKAGE PREDICTION THROUGH SIMILARITY ANALYSIS

FIELD

The present application generally relates to information technology, and, more particularly, to linkage prediction techniques.

BACKGROUND

Cleaning and reconfiguring data into usable system-specific input are commonly time-consuming tasks. Challenges with such tasks can include, for example, the volume of relevant data, the amount of customization needed for particular systems, and the difficulty in determining relationships among data elements.

SUMMARY

In one embodiment of the present invention, techniques for linkage prediction through similarity analysis are provided. An exemplary computer-implemented method can include extracting multiple features from (i) one or more attributes of a set of source nodes within a knowledge graph and (ii) one or more attributes of a set of target nodes within the knowledge graph, wherein at least one extracted feature satisfies a designated complexity level. Such a method can also include performing a similarity analysis across the at least one extracted feature by applying one or more similarity measures to the at least one extracted feature. Further, such a method can include predicting one or more sets of links between the source nodes and the target nodes based on the similarity analysis, wherein one or more sets of predicted links satisfy a pre-determined accuracy threshold, and outputting the one or more sets of predicted links to a user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps.

These and other objects, features and advantages of the present invention will become apparent from the following detailed description of illustrative embodiments thereof, which is to be read in connection with the accompanying drawings.

DETAILED DESCRIPTION

Figure 1:
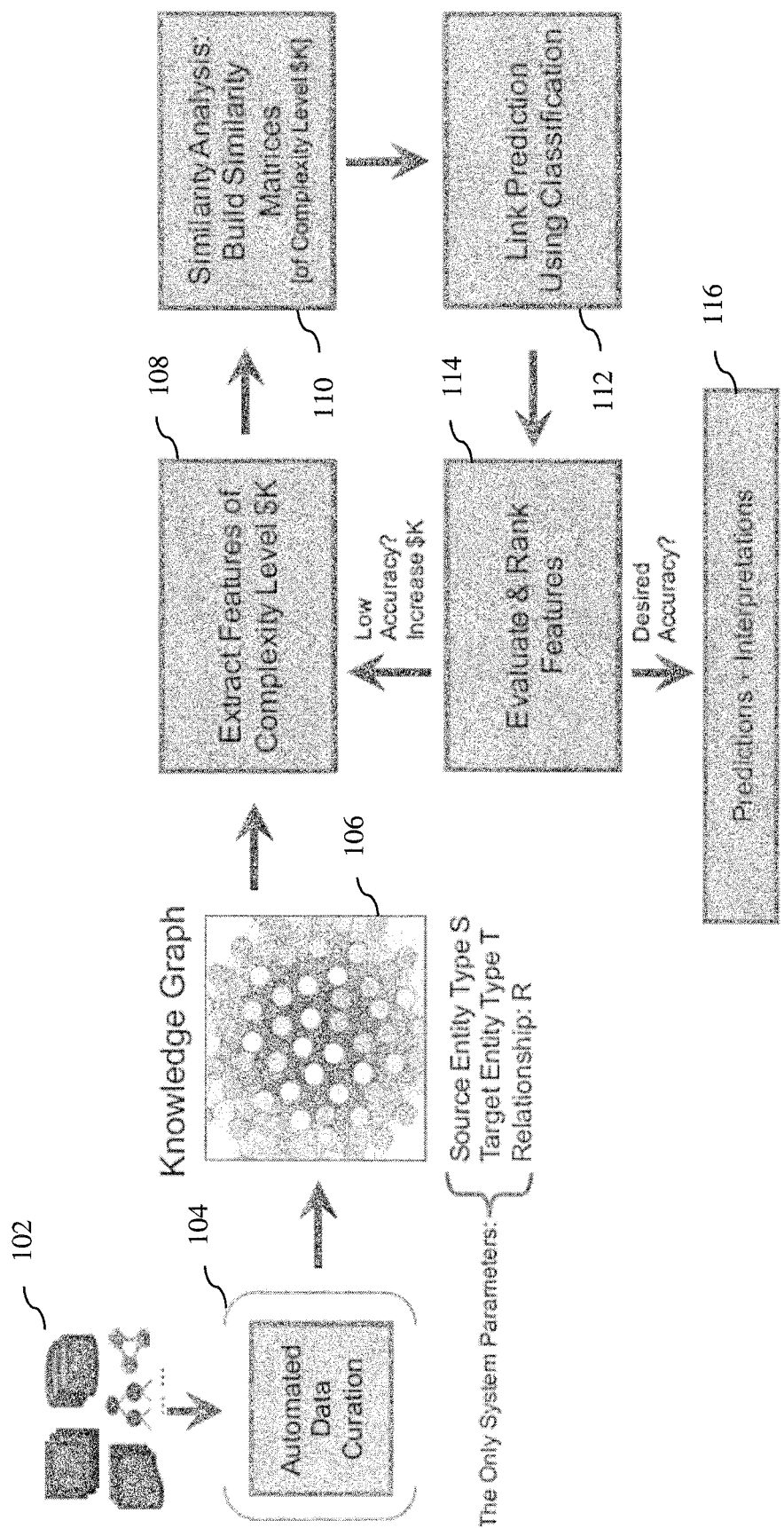
FIG. 1 is a diagram illustrating system architecture, according to an embodiment of the invention.

As described herein, an embodiment of the invention includes techniques for automatic and interpretable linkage prediction through knowledge-driven similarity analysis. Linkage prediction techniques aim to forecast the existence of a certain relationship (linkage) between two entities of interest in a set of data. In one or more embodiments of the invention, the entities and the relationship (linkage) can be of a particular type. In an example scenario, the entities could be of the type "Person," and the linkage could be of the type "Friendship," and the linkage prediction goal is to predict a friendship relationship among two people that are not known to be friends in the existing reference knowledge base. Accordingly, a goal of linkage prediction includes predicting either a missing link between existing entities in a knowledge base, or predicting linkages for a new entity that is added to a knowledge base.

At least one embodiment of the invention includes implementing similarity-based linkage prediction techniques, wherein a linkage is predicted based on an analysis of the similarity between entities. Such an embodiment can include a fully automated process that does not require any algorithm selection or parameter tuning. One or more embodiments of the invention include performing a detailed similarity analysis between target entities using multiple similarity measures, and automatically identifying one or more of those similarity algorithms for the given prediction task. Selection of specific similarity algorithms can be carried out by evaluating the accuracy of relevant classification models (for example, via component 114 in FIG. 1, as detailed below). In such an evaluation, a portion of the existing links can be hidden, and the ability of the models to find those links can be measured.

As used herein, similarity measures can include various data-type based measures for attribute similarity analysis such as, for example, exact string matching, sub-string matching, fuzzy (error-tolerant) string matching, range and distribution matching for numerical data and dates, etc. The similarity measures can additionally include graph-based relational similarity measures such as, for example, common neighbors, the Jaccard index over neighbors, frequency-based weighted similarity, neighbor similarity, higher-order neighbors, etc.

At least one embodiment of the invention includes taking and/or using as input a knowledge base, which can include a knowledge graph (KG). In one or more embodiments of the invention that include utilizing a KG, the KG can be built through information extraction from text documents and/or structured databases. Example sources of text documents can include textual contents of web pages, portable document format (PDF) documents, data sets available on the Web, data stored in public or private databases and data repositories, etc. In addition to a knowledge base, at least one embodiment of the invention can include taking and/or using as input a specific type of entity T and a specific type of relationship (linkage) R (as designated by the user, for example). Such an embodiment of the invention can additionally include computing similarity across entities (of the specified type) to build a similarity matrix. Such a similarity matrix can include one row per entity in the source set of entities, and one column per entity in the target set of entities. Additionally, the value in row i column j of the matrix can include, for example, the similarity score between the entity represented in row i and the entity represented in row j.

Also, one or more embodiments of the invention can include outputting a set of pairs of entities of type 5 and T, wherein each pair is in the form $(e_S, e_T)$, wherein $e_S$ is of type S and $e_T$ is of type T. Additionally, a relationship of type R can be predicted for each of the pairs. Optionally, such an embodiment can include additionally outputting a confidence score for the predicted linkage between each pair in the output. The confidence score can be calculated through a probabilistic model built using the similarity matrices (similarity scores between various features of the entities), and reflects the probability that the predicted linkage is accurate. Further, at least one embodiment of the invention can include generating an output that includes a prediction of links between entities as well as an explanation for each prediction. Such explanations can include information such as, for example, identification and/or description of a similarity to existing nodes and their properties, the specific similarity measure utilized, etc.

Additionally, one or more embodiments of the invention can be implemented in a variety of applications such as, for example, healthcare (predicting drug interactions, etc.), personalized medicine (predicting adverse drug reactions for a given patient, etc.), social networks (predicting friendships, etc.), and e-commerce (recommendations on a shopping website, etc.).

FIG. 1 is a diagram illustrating system architecture, according to an embodiment of the invention. By way of illustration, FIG. 1 depicts raw data 102 that are automatically transformed into a KG 106 via an automated data curation component 104. By way of example, component 104 can transform the raw data 102 into the KG 106 via one or more automated knowledge based construction techniques that take raw input data and transform such input data into a knowledge base (composed of entities, attributes and relationships), and subsequently transforms the knowledge base into a knowledge graph. The KG 106 is then used as input along with source and target entity types and a relationship type.

Additionally, at least one embodiment of the invention includes setting the complexity level, for example, at $K=0. The complexity level determines how complex the similarity measures are, and how complex the features built out of those similarity measures are. By way merely of example, a complexity level of 1 can consider only string-valued attributes of entities in the KG, while a complexity level of 2 can additionally take into account numerical values, and a complexity level of 3 can further take into account connected entities and their string-valued attributes. Also, as used herein, feature complexity levels can be based, for example, on entity attributes (literal values), tokenized/analyzed attribute values, relationships, related entities, related entity attributes of increasing distance, etc.

Additionally, as depicted in FIG. 1, component 108 can extract features of the designated complexity level ($K) from the KG 106 for use in a similarity analysis. In one or more embodiments of the invention, features with complexity level $K can be extracted from source and target node attributes, as well as attributes and relationships of neighboring nodes. Also, such features can extend beyond data type (string versus numeric) classification of attributes. For example, additional features can include string-valued attributes that are unique per each entity, string-valued attributes that are shorter than 100 characters, string-valued attributes that are longer than 100 characters, normalized values, distribution of numerical values, etc.

Such a similarity analysis can be then performed by component 110 using the extracted features. In carrying out a similarity analysis, component 110 can, for example, build one or more similarity matrices based on similarity scores between source entities and target entities. By way merely of example, features can be viewed as a set of values (a set of string-valued attributes, for instance) and a set similarity measures such as the Jaccard coefficient (the size of the intersection of the two sets, divided by the size of the union of the two sets) can be used. Another example can include comparing the distribution of the numeric values. Additionally, link prediction is performed by component 112 using classifications over the generated similarity matrices. The classifications used by component 112 can include, for example, machine learning classifiers that classify each pair in the input as a potential "link" or "non-link" (along with a confidence score) based on the similarity scores in the input similarity matrices. Such a classification can be based, for example, on a logistic regression model that estimates the probability of a given pair being a "link."

The outputs of the link prediction (via component 112) are evaluated and ranked by component 114. Specifically, in one or more embodiments of the invention, one or more features of the link prediction are evaluated and ranked. For example, if the majority of the "accurate" links predicted (pairs classified as "link," wherein it is known in advance that the pairs should be classified as such) are based only on features built from string-valued attributes of source and target nodes, then string-valued attributes can be ranked higher than other features.

In one or more embodiments of the invention, one or more machine learning methods (such as, for example, logistic regression) can be used for feature ranking. Additionally, in at least one embodiment of the invention, feature evaluation can be carried out, for example, using cross-fold validation and/or measures of accuracy. Further, such evaluations can be based on similar pairs, existing links, as well as the ranking of the features. Also, the evaluation can be carried out until an accuracy threshold is met. The input KG contains links (Relationships of type R specified by the user, as seen in FIG. 1 in conjunction with component 106) but such links can be an incomplete set. For an accuracy evaluation such as noted above, the existing links can be removed and a determination can be made as to whether the removed links can be successfully predicted. At least one embodiment of the invention includes identifying a model that performs best according to such existing links, and such a model can subsequently be used to predict new links. If the prediction is not acceptable, the complexity level ($K) can be increased incrementally and the above-noted steps repeated. Ultimately, the prediction 116 is output along with the ranked features and identification of one or more similar entity pairs.

Figure 2:
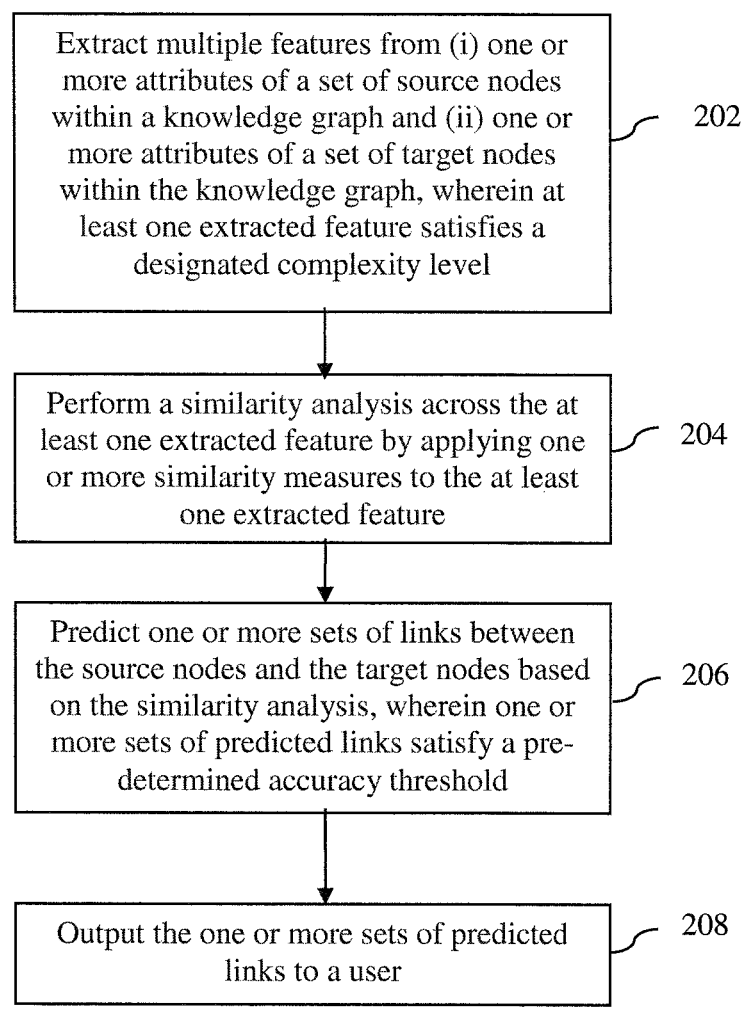
FIG. 2 is a flow diagram illustrating techniques, according to an embodiment of the invention.

FIG. 2 is a flow diagram illustrating techniques according to an embodiment of the invention. Step 202 includes extracting multiple features from (i) one or more attributes of a set of source nodes within a knowledge graph and (ii) one or more attributes of a set of target nodes within the knowledge graph, wherein at least one extracted feature satisfies a designated complexity level. Extracting can also include extracting the multiple features from one or more attributes of one or more nodes neighboring the set of source nodes within the knowledge graph, extracting the multiple features from one or more attributes of one or more nodes neighboring the set of target nodes within the knowledge graph, and/or extracting the multiple features from one or more relationships between nodes within the knowledge graph.

At least one embodiment of the invention can include transforming a collection of raw data, and integrating the transformed data into the knowledge graph. Additionally, at least one embodiment of the invention can include identifying a source entity node type, a target entity node type, and a relationship type.

Step 204 includes performing a similarity analysis across the at least one extracted feature by applying one or more similarity measures to the at least one extracted feature. The one or more similarity measures can include one or more data-type based measures and/or one or more graph-based relational similarity measures. Also, at least one embodiment of the invention can include generating a similarity matrix comprising similarity scores between the set of source nodes and the set of target nodes based on said similarity analysis. Step 206 includes predicting one or more sets of links between the source nodes and the target nodes based on the similarity analysis, wherein one or more sets of predicted links satisfy a pre-determined accuracy threshold.

Step 208 includes outputting the one or more sets of predicted links to a user. At least one embodiment of the invention can additionally include generating a rationale for the one or more sets of predicted links, wherein the rationale comprises identification of one or more similar node pairs, and outputting a generated rationale to the user. Further, one or more embodiments of the invention can include generating a ranking of the extracted features and outputting the ranking of the extracted features to the user.

The techniques depicted in FIG. 2 can also include setting a complexity level to a value upon a determination that the one or more predicted links do not satisfy the pre-determined accuracy threshold. Further, in accordance with the techniques depicted in FIG. 2, software can be provided as a service in a cloud environment.

At least one embodiment of the invention (such as the techniques depicted in FIG. 2, for example), can include implementing a service via a transmission server to receive data from a data source and send selected data to users (for example, at a provided destination address of a device. The transmission server includes a memory, a transmitter, and a microprocessor. Such an embodiment of the invention can also include providing a viewer application to the users for installation on their individual devices. Additionally, in such an embodiment of the invention, after a user enrolls, the service receives raw data and/or a transformed KG sent from a data source to the transmission server. The server can process the information, for example, based upon user-provided user preference information that is stored in memory on the server. Subsequently, an alert is generated containing one or more identified linkage predictions derived from the received data. The alert can be formatted into data blocks, for example, based upon any provided alert format preference information. Subsequently, the alert and/or formatted data blocks are transmitted over a data channel to the user's device. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
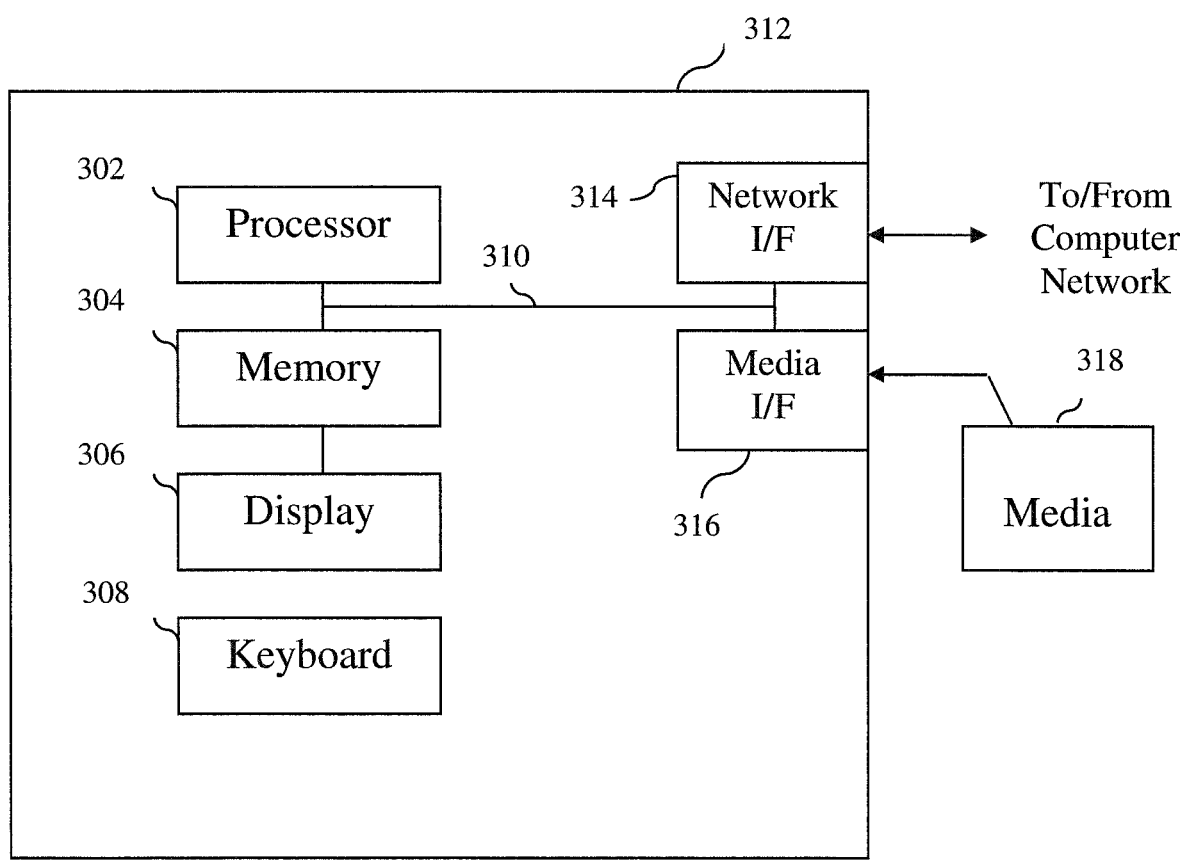
FIG. 3 is a computer system, according to an embodiment of the invention.

Additionally, an embodiment of the invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
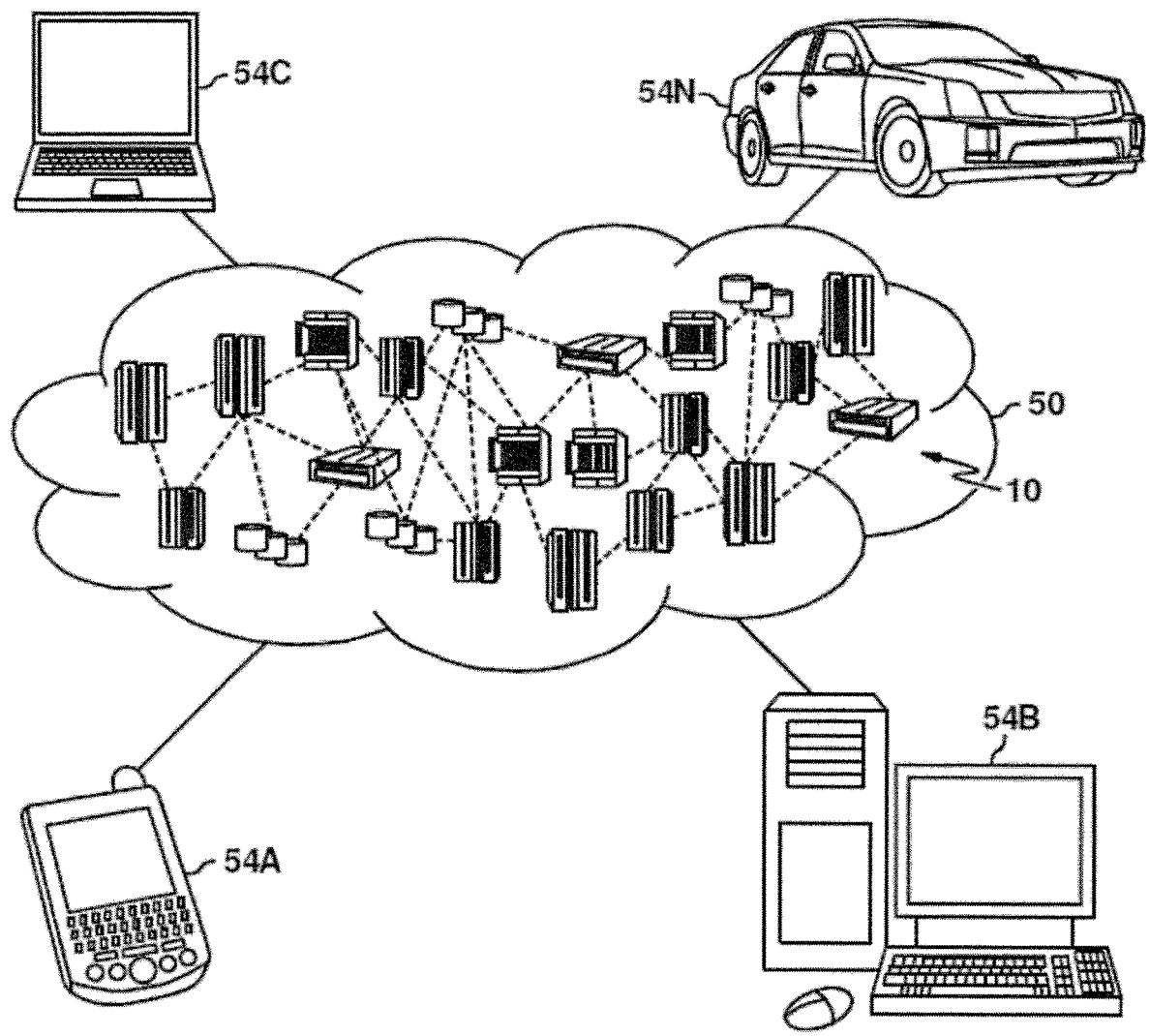
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
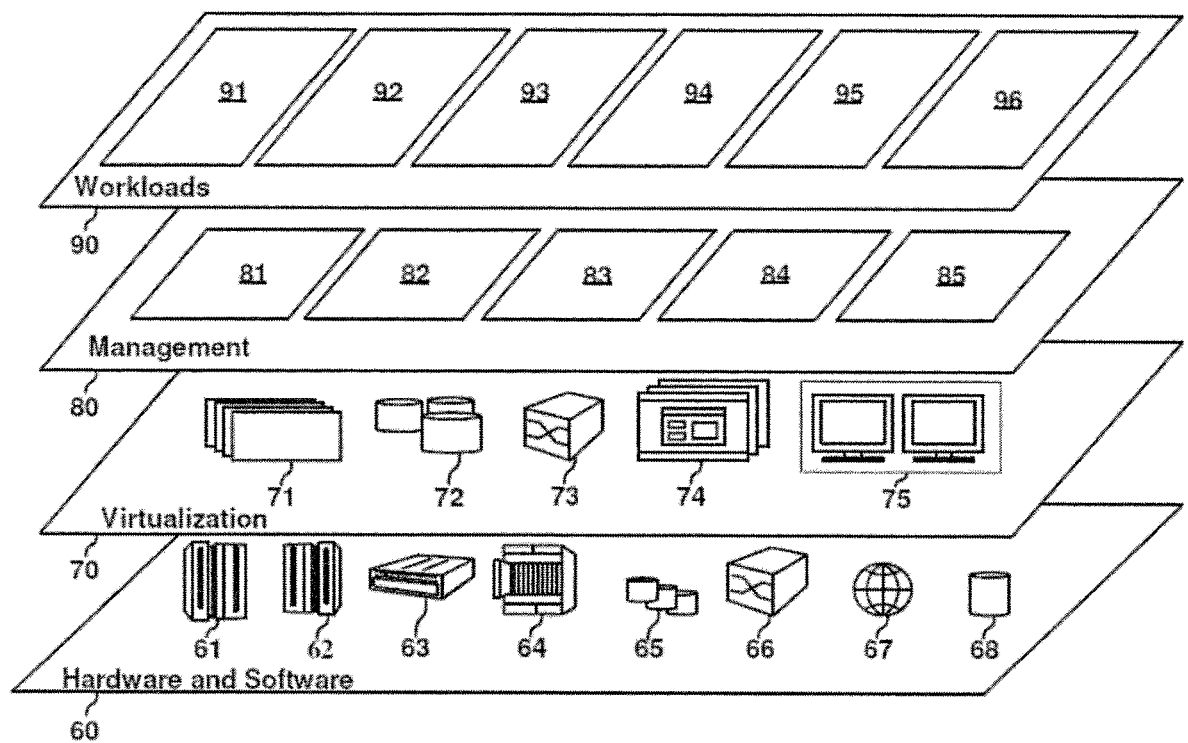
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a similarity analysis-based linkage prediction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, predicting a linkage between entities within a collection of data based on an analysis of the similarity between entities and without the need for algorithm selection or parameter tuning.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   extracting multiple features from (i) one or more attributes of a set of source nodes within a knowledge graph and (ii) one or more attributes of a set of target nodes within the knowledge graph, wherein at least one extracted feature satisfies a designated complexity level;
   performing a similarity analysis across the at least one extracted feature by applying one or more similarity measures to the at least one extracted feature;
   predicting one or more sets of links between the source nodes and the target nodes based on the similarity analysis, wherein one or more sets of predicted links satisfy a pre-determined accuracy threshold;
   generating a similarity matrix comprising: (i) one row per entity in the set of source nodes, (ii) one column per entity in the set of target nodes, and (iii) a value in row i column j of the similarity matrix indicating a similarity score, based on based on said similarity analysis, between the entity represented in row i and the entity represented in row j;
   building a probabilistic model based at least in part on the similarity matrix; and
   calculating, using the probabilistic model, a confidence score for each of the one or more sets of predicted links; and
   outputting (i) the one or more sets of predicted links and (ii) the calculated confidence scores to a user.

2. The computer-implemented method of claim 1, comprising:
   transforming a collection of raw data; and integrating the transformed data into the knowledge graph.

3. The computer-implemented method of claim 1, comprising:
identifying a source entity node type, a target entity node type, and a relationship type.

4. The computer-implemented method of claim 1, comprising:
setting a complexity level to a value upon a determination that the one or more predicted links do not satisfy the pre-determined accuracy threshold.

5. The computer-implemented method of claim 1, comprising:
generating a rationale for the one or more sets of predicted links, wherein the rationale comprises identification of one or more similar node pairs.

6. The computer-implemented method of claim 5, comprising:
outputting a generated rationale to the user.

7. The computer-implemented method of claim 1, comprising:
generating a ranking of the extracted features.

8. The computer-implemented method of claim 7, comprising:
outputting the ranking of the extracted features to the user.

9. The computer-implemented method of claim 1, wherein said extracting further comprises extracting the multiple features from one or more attributes of one or more nodes neighboring the set of source nodes within the knowledge graph.

10. The computer-implemented method of claim 1, wherein said extracting further comprises extracting the multiple features from one or more attributes of one or more nodes neighboring the set of target nodes within the knowledge graph.

11. The computer-implemented method of claim 1, wherein said extracting further comprises extracting the multiple features from one or more relationships between nodes within the knowledge graph.

12. The computer-implemented method of claim 1, wherein the one or more similarity measures comprise one or more data-type based measures.

13. The computer-implemented method of claim 1, wherein the one or more similarity measures comprise one or more graph-based relational similarity measures.

14. The computer-implemented method of claim 1, wherein software is provided as a service in a cloud environment.

15. A computer program product comprising a computer readable storage medium having program instructions embodied therewith, the program instructions executable by a device to cause the device to:
extract multiple features from (i) one or more attributes of a set of source nodes within a knowledge graph and (ii) one or more attributes of a set of target nodes within the knowledge graph, wherein at least one extracted feature satisfies a designated complexity level;
perform a similarity analysis across the at least one extracted feature by applying one or more similarity measures to the at least one extracted feature;
predict one or more sets of links between the source nodes and the target nodes based on the similarity analysis, wherein one or more sets of predicted links satisfy a pre-determined accuracy threshold;
generate a similarity matrix comprising: (i) one row per entity in the set of source nodes, (ii) one column per entity in the set of target nodes, and (iii) a value in row i column j of the similarity matrix indicating a similarity score, based on based on said similarity analysis, between the entity represented in row i and the entity represented in row j;
build a probabilistic model based at least in part on the similarity matrix; and
calculate, using the probabilistic model, a confidence score for each of the one or more sets of predicted links; and
output (i) the one or more sets of predicted links and (ii) the calculated confidence scores to a user.

16. The computer program product of claim 15, wherein the program instructions executable by a computing device further cause the computing device to:
transform a collection of raw data; and
integrate the transformed data into the knowledge graph.

17. A system comprising:
a memory; and
at least one processor coupled to the memory and configured for:
extracting multiple features from (i) one or more attributes of a set of source nodes within a knowledge graph and (ii) one or more attributes of a set of target nodes within the knowledge graph, wherein at least one extracted feature satisfies a designated complexity level;
performing a similarity analysis across the at least one extracted feature by applying one or more similarity measures to the at least one extracted feature;
predicting one or more sets of links between the source nodes and the target nodes based on the similarity analysis, wherein one or more sets of predicted links satisfy a pre-determined accuracy threshold;
generating a similarity matrix comprising: (i) one row per entity in the set of source nodes, (ii) one column per entity in the set of target nodes, and (iii) a value in row i column j of the similarity matrix indicating a similarity score, based on based on said similarity analysis, between the entity represented in row i and the entity represented in row j;
building a probabilistic model based at least in part on the similarity matrix; and
calculating, using the probabilistic model, a confidence score for each of the one or more sets of predicted links; and
outputting (i) the one or more sets of predicted links and (ii) the calculated confidence scores to a user.

18. The system of claim 17, wherein the at least one processor is further configured for:
transforming a collection of raw data; and
integrating the transformed data into the knowledge graph.

19. The system of claim 17, wherein software is provided as a service in a cloud environment.

* * * * *